(12) United States Patent
Engelhardt et al.

(10) Patent No.: US 11,725,691 B2
(45) Date of Patent: Aug. 15, 2023

(54) HEMISPHERICAL BUSHING ASSEMBLY

(71) Applicant: Steering Solutions IP Holding Corporation, Saginaw, MI (US)

(72) Inventors: Jonathan R. Engelhardt, Saginaw, MI (US); Patrick D. McCall, Saginaw, MI (US); Joseph B. Rombach, Bath, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 228 days.

(21) Appl. No.: 17/173,627

(22) Filed: Feb. 11, 2021

(65) Prior Publication Data

US 2021/0277943 A1    Sep. 9, 2021

Related U.S. Application Data

(60) Provisional application No. 62/987,095, filed on Mar. 9, 2020.

(51) Int. Cl.
| | |
|---|---|
| *F16C 33/12* | (2006.01) |
| *F16C 17/10* | (2006.01) |
| *B62D 5/04* | (2006.01) |
| *F16H 57/025* | (2012.01) |
| *B62D 3/12* | (2006.01) |

(52) U.S. Cl.
CPC ............ *F16C 33/12* (2013.01); *B62D 5/0403* (2013.01); *F16C 17/10* (2013.01); *F16H 57/025* (2013.01); *B62D 3/12* (2013.01)

(58) Field of Classification Search
None
See application file for complete search history.

(56) References Cited

U.S. PATENT DOCUMENTS

| 5,388,884 A | 2/1995 | Keehner et al. |
| 9,731,749 B2 * | 8/2017 | Kim ..................... B62D 5/0403 |
| 10,046,795 B2 * | 8/2018 | Lee ......................... B62D 3/12 |
| 2005/0104314 A1 | 5/2005 | Maruyama et al. |
| 2018/0111641 A1 * | 4/2018 | Hetzel .................. B62D 5/0448 |

FOREIGN PATENT DOCUMENTS

| CN | 104228503 A | 12/2014 | |
| CN | 105383548 A | 3/2016 | |
| CN | 205469254 U | 8/2016 | |
| CN | 105946964 A | * 9/2016 | ............... B62D 3/12 |
| CN | 107042840 A | 8/2017 | |
| CN | 109312775 A | 2/2019 | |
| DE | 102012011601 A1 | 12/2018 | |

OTHER PUBLICATIONS

First Office Action regarding corresponding CN App. No. 202110256780.6; dated Aug. 2, 2022.

* cited by examiner

*Primary Examiner* — Faye M Fleming
(74) *Attorney, Agent, or Firm* — Dickinson Wright PLLC

(57) ABSTRACT

A bushing assembly includes a bushing housing having an inner surface that is non-planar. The bushing assembly also includes an insert member having an interface surface in contact with the inner surface of the bushing housing, wherein the interface surface comprises a non-planar geometry corresponding to the inner surface of the bushing housing.

16 Claims, 2 Drawing Sheets

HEMISPHERICAL BUSHING ASSEMBLY

CROSS REFERENCE TO RELATED APPLICATION

This application claims priority to U.S. Provisional Patent Application Ser. No. 62/987,095, filed Mar. 9, 2020, the disclosure of which is incorporated by reference herein in its entirety.

FIELD OF THE INVENTION

The disclosure herein relates to bushing assemblies and, more particularly, to a hemispherical bushing assembly which may be utilized with a steering system.

BACKGROUND

Bushing assemblies for use in minimizing axial and radial play in connecting joints are used in a variety of industries. In general, such bushing assemblies are utilized in mounting a shaft within a bore formed in a fixed structural member. Such bushing assemblies are located within the bore between the shaft and the fixed support member. Such known bushing assemblies are intended to be wedged between the shaft and the fixed support structure, within the bore, and tightened therein such that the wedge will function to prevent radial movement of the shaft. In addition, an axial end of the bushing engages a shoulder integrally formed with or attached to the shaft to prevent axial shifting.

Examples of bushing assemblies are numerous, but some may cause an increase in friction due to binding when misalignment of system components is present. First, what is referred to as a full soft mount may be utilized, which requires a large package, high cost, poor vehicle handling performance, and dual press to a steering gear in steering column systems. Such an assembly includes two pieces of steel that are overmolded with rubber. Second, a hemispherical washer design may be employed, which requires a large package, high cost, and manual assembly to a steering gear in steering column systems. Such an assembly includes three pieces. Third, a hard mount may be used, with a smaller package and sensitivity to frame misalignment. This is formed of a single steel piece. Fourth, a through bolt design requires a medium package, but includes sensitivity to frame misalignment, no added manufacturing steps at a supplier site. However, the OEM assembly plant must use a nut to assemble to a vehicle.

SUMMARY OF THE DISCLOSURE

According to one aspect of the disclosure, a bushing assembly includes a bushing housing having an inner surface that is non-planar. The bushing assembly also includes an insert member having an interface surface in contact with the inner surface of the bushing housing, wherein the interface surface comprises a non-planar geometry corresponding to the inner surface of the bushing housing.

According to another aspect of the disclosure, a rack electric power steering system includes a rack housing mountable to a vehicle frame. The steering system also includes a steering gear housing mounted to the rack housing. The steering gear housing has a bushing assembly. The bushing assembly includes a bushing housing having an inner surface that is concave. The bushing assembly also includes an insert member having an interface surface in contact with the inner surface of the bushing housing, wherein the interface surface comprises a convex geometry corresponding to the inner surface of the bushing housing, the interface surface pivotable along the inner surface of the bushing housing to accommodate misalignment with a component that the bushing assembly is being mounted to.

According to yet another aspect of the disclosure, a bushing assembly includes a bushing housing having an inner surface that is non-planar. The bushing assembly also includes a metal insert member having an interface surface in contact with the inner surface of the bushing housing, wherein the interface surface comprises a non-planar geometry corresponding to the inner surface of the bushing housing, wherein the bushing housing defines a threaded aperture extending through the inner surface, wherein the metal insert member defines a bore that is partially aligned with the threaded aperture.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring to the Figures, where the invention will be described with reference to specific embodiments, without limiting same, a bushing assembly is disclosed. As will be appreciated, the bushing assembly allows compliance for misaligned frames or interface components at the vehicle level, thereby reducing system level sensitivity to misalignment, while also reducing assembly and manufacturing complexity. While the embodiments of the bushing assembly disclosed herein are discussed in the context of an electric power steering system, it is to be appreciated that the bushing assembly may benefit numerous alternative applications. Therefore, the scope of the bushing assembly should not be considered as limiting to a steering system, or even a vehicle application.

Figure 1:
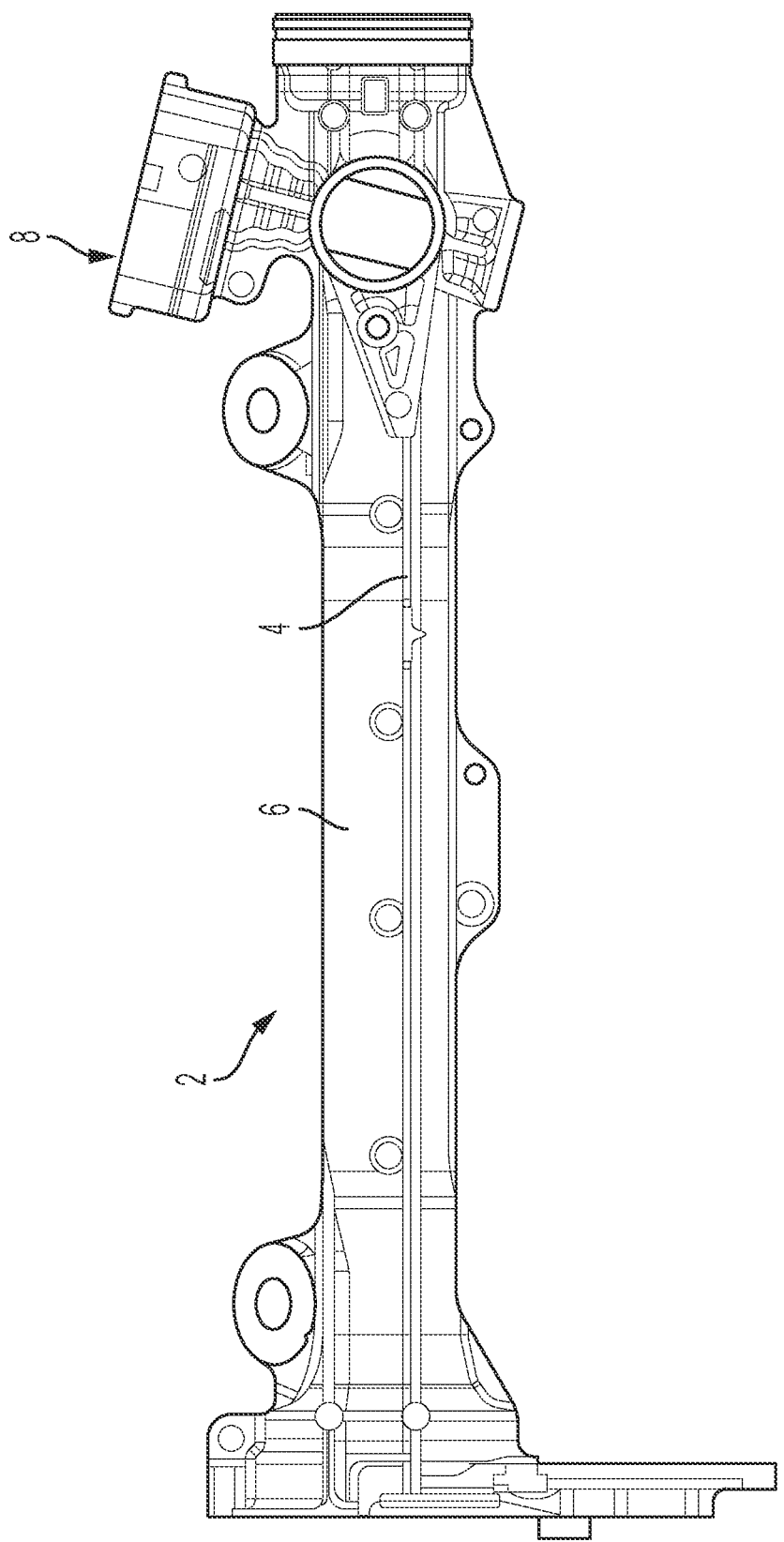
FIG. 1 is a side, elevational view of a portion of a rack electric power steering system.

Referring now to FIG. 1, a portion of a rack electric power steering (REPS) system is illustrated and generally referenced with numeral 2. The REPS system 2 includes a rack 4 disposed within a rack housing 6. The rack 4 is translated in response to a steering gear input initiated by an operator—either through a steering shaft directly coupled to the steering gear or via a steer-by-wire system. The steering gear is located within a steering gear housing and is generally referenced with numeral 8 (FIGS. 1 and 2).

Figure 2:
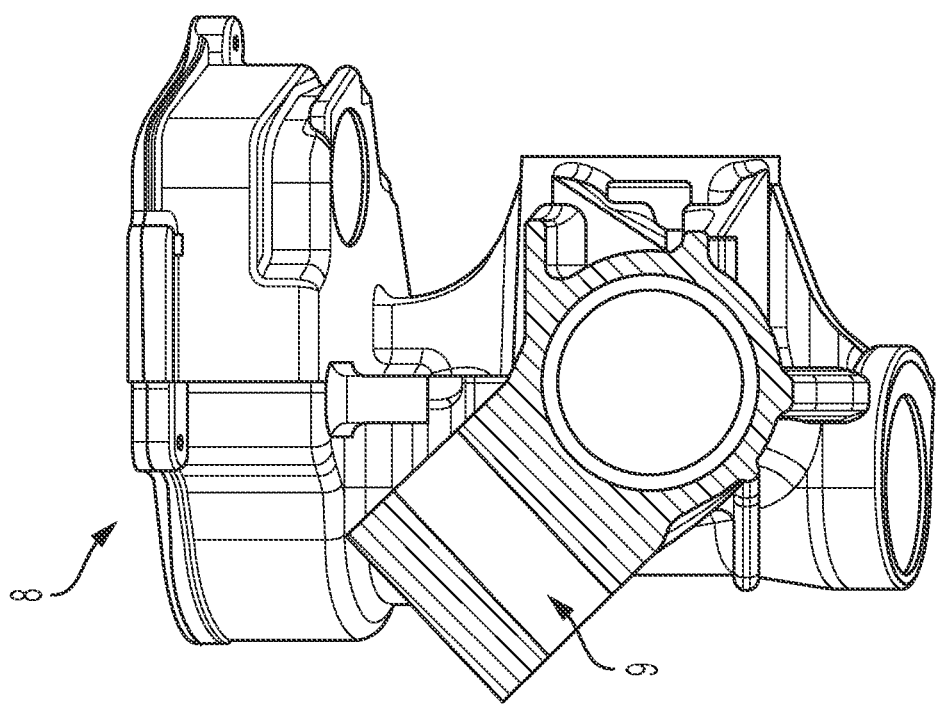
FIG. 2 is a perspective view of a steering gear housing of the rack electric power steering system.

Referring now to FIG. 2, the steering gear housing 8 is illustrated in greater detail. The steering gear housing 8 is mounted to a structural member, such as a vehicle frame. However, misalignment between a mounting surface of the steering gear housing 8 and a surface of the structural member (e.g., vehicle frame) may be present. The embodiments described herein address such misalignment by including a bushing assembly 10 (FIG. 3) within a hole 9 defined by the steering gear housing 8. The hole 9 is configured to receive the bushing assembly 10 and a mechanical fastener therethrough for mounting purposes.

Figure 3:
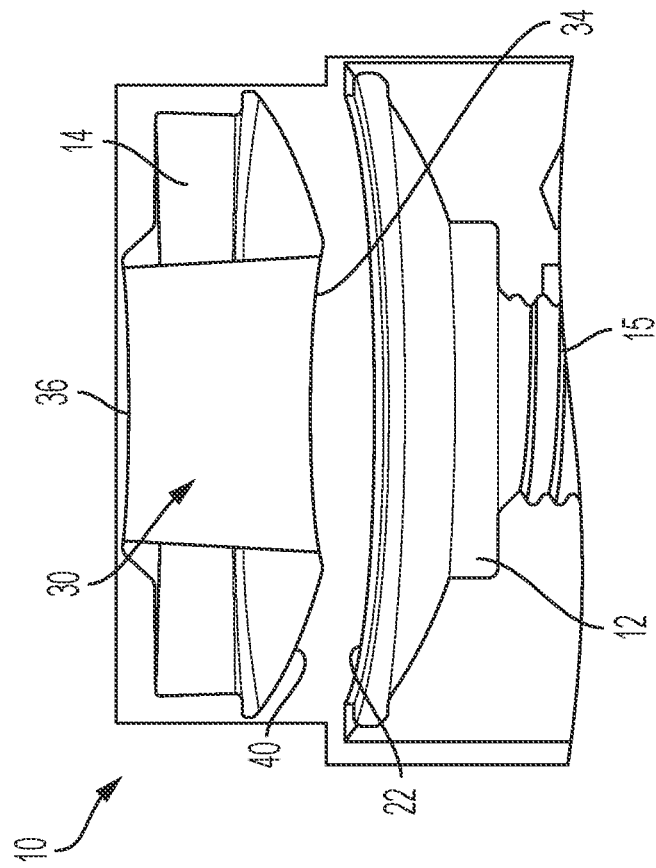
FIG. 3 is a cross-sectional view of a bushing assembly for the steering gear housing.

Referring now to FIG. 3, a bushing assembly 10 is shown. The bushing assembly 10 includes a housing 12 and an insert member 14. The housing 12 is disposed within the hole 9 of the steering gear housing 8 or is integrally formed with the steering gear housing 8 as structural features within the hole 9. The housing 12 and the insert member 14 are configured to receive a fastener, such as a bolt (not shown), for example, through the components to control axial and radial play of an overall assembly. The housing 12 includes a threaded aperture 15 having an internal thread to allow a threaded fastener to secure thereto.

The housing 12 includes an inner surface 22 that extends outwardly from the threaded aperture 15 and is non-planar shaped. The inner surface 22 is concave. In other words, the inner surface 22 of the housing 12 may be referred to as conically shaped or hemispherical shaped, for example.

The insert member 14 is formed of a rigid material, such as metal (e.g., steel) in some embodiments. The insert member 14 is a single, integrally formed component. The insert member 14 defines a bore 30 for receiving the fastener and is aligned with the threaded aperture 15. The bore 30 extends axially from a first end 34 to a second end 36. Extending radially outwardly from the first end 34 of the bore 30 is an interface surface 40. The interface surface 40 is in contact with the inner surface 22 of the housing 22 and has a geometry that corresponds to the inner surface 22 in a manner that allows smooth sliding of the interface surface 40 along the inner surface 22 to facilitate pivoting of the insert member 14. In other words, the interface surface 40 is non-planar, as is the case with the inner surface 22. In the embodiment of the concave inner surface 22 of the housing, the interface surface 40 is convex to fit within the concave portion of the housing 12. Accordingly, the interface surface 40 may be referred to as conically shaped or hemispherical shaped, for example, as discussed above with the inner surface 22.

The corresponding curved or conical shapes of the inner surface 22 and interface surface 40 allows pivoting of the insert member 14 when a surface of the insert member 14 is placed into contact with the above-described structural member (e.g., vehicle frame) during assembly. The 3-dimensional pivoting accommodates potential misalignment at the interface of the insert member 22 and the structural member to be mounted to.

The bore 30 is tapered from the first end 34 to the second end 36. In particular, the bore 30 has a larger cross-sectional area at the interface surface 40 of the insert member 14, when compared to the second end 36, thereby narrowing the bore 30 from the first end 34 to the second end 36. Tapering of the bore 30 allows a mechanical fastener to extend through the threaded aperture 15 and the bore 30 over a range of pivoted positions of the insert member 14, thereby avoiding binding or increased friction during assembly.

A single assembly step is all that is required for the bushing assembly 10. In particular, the insert member 14 is inserted into the housing 12 until the interface surface 40 contacts the inner surface 22 of the housing 12 in a fully seated manner. To maintain this position during shipment of the bushing assembly 10 to an OEM, the insert member 14 may be staked to the housing 12 with a plurality of protrusions extending from an outer perimeter of the insert member 14. Alternative securement methods are contemplated.

While the bushing assembly 10 may benefit many industries and applications, in some embodiments, the bushing assembly 10 disclosed herein is employed in a steering column system, as discussed above. Regardless of the application, it is contemplated that the bushing assembly 10 reduces system level sensitivity to misalignment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A bushing assembly comprising:
a bushing housing having an inner surface that is non-planar; and
an insert member having an interface surface in contact with the inner surface of the bushing housing, wherein the interface surface comprises a non-planar geometry corresponding to the inner surface of the bushing housing, wherein the inner surface is concave and the interface surface is convex, the interface surface pivotable along the inner surface of the bushing housing to accommodate misalignment with a component that the bushing assembly is being mounted to.

2. A bushing assembly comprising:
a bushing housing having an inner surface that is non-planar; and
an insert member having an interface surface in contact with the inner surface of the bushing housing, wherein the interface surface comprises a non-planar geometry corresponding to the inner surface of the bushing housing, wherein the bushing housing defines a threaded aperture extending through the inner surface, wherein the insert member defines a bore that is partially aligned with the threaded aperture.

3. The bushing assembly of claim 2, wherein the bore is tapered from a first end to a second end, the bore having a larger cross-sectional area at the interface surface of the insert member to allow a mechanical fastener to extend through the threaded aperture and the bore over a range of pivoted positions of the insert member.

4. The bushing assembly of claim 1, wherein the insert member is formed of metal.

5. A bushing assembly comprising:
a bushing housing having an inner surface that is non-planar; and
an insert member having an interface surface in contact with the inner surface of the bushing housing, wherein the interface surface comprises a non-planar geometry corresponding to the inner surface of the bushing housing, wherein the insert member is staked to the bushing housing with a plurality of protrusions extending from an outer perimeter of the insert member.

6. A rack electric power steering system comprising:
a rack housing mountable to a vehicle frame;
a steering gear housing mounted to the rack housing, the steering gear housing having a bushing assembly comprising:
a bushing housing having an inner surface that is concave; and an insert member having an interface surface in contact with the inner surface of the bushing housing, wherein the interface surface comprises a convex geometry corresponding to the inner surface of the bushing housing, the interface surface pivotable along the inner surface of the bushing housing to accommodate misalignment with a component that the bushing assembly is being mounted to.

7. The rack electric power steering system of claim 6, wherein the bushing housing defines a threaded aperture extending through the inner surface, wherein the insert member defines a bore that is partially aligned with the threaded aperture.

8. The rack electric power steering system of claim 7, wherein the bore is tapered from a first end to a second end, the bore having a larger cross-sectional area at the interface surface of the insert member to allow a mechanical fastener to extend through the threaded aperture and the bore over a range of pivoted positions of the insert member.

9. The rack electric power steering system of claim 6, wherein the insert member is formed of metal.

10. The rack electric power steering system of claim 6, wherein the insert member is staked to the bushing housing with a plurality of protrusions extending from an outer perimeter of the insert member.

11. A bushing assembly comprising:
a bushing housing having an inner surface that is non-planar; and
a metal insert member having an interface surface in contact with the inner surface of the bushing housing, wherein the interface surface comprises a non-planar geometry corresponding to the inner surface of the bushing housing, wherein the bushing housing defines a threaded aperture extending through the inner surface, wherein the metal insert member defines a bore that is partially aligned with the threaded aperture.

12. The bushing assembly of claim 11, wherein the inner surface is concave and the interface surface is convex, the interface surface pivotable along the inner surface of the bushing housing to accommodate misalignment with a component that the bushing assembly is being mounted to.

13. The bushing assembly of claim 11, wherein the bore is tapered from a first end to a second end, the bore having a larger cross-sectional area at the interface surface of the insert member to allow a mechanical fastener to extend through the threaded aperture and the bore over a range of pivoted positions of the insert member.

14. The bushing assembly of claim 11, wherein the insert member is staked to the bushing housing with a plurality of protrusions extending from an outer perimeter of the insert member.

15. The bushing assembly of claim 2, wherein the insert member is formed of metal.

16. The bushing assembly of claim 5, wherein the insert member is formed of metal.

* * * * *